(12) United States Patent
Takano et al.

(10) Patent No.: US 11,000,977 B2
(45) Date of Patent: May 11, 2021

(54) MOLDING METHOD FOR FIBER-REINFORCED PLASTIC STRUCTURE AND VEHICLE WHEEL

(71) Applicant: Mitsubishi Chemical Corporation, Tokyo (JP)

(72) Inventors: Tsuneo Takano, Toyohashi (JP); Yuuji Kazehaya, Toyohashi (JP); Mitsushi Nishimura, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/543,272

(22) Filed: Aug. 16, 2019

(65) Prior Publication Data

US 2019/0381704 A1    Dec. 19, 2019

Related U.S. Application Data

(62) Division of application No. 14/406,768, filed as application No. PCT/JP2013/066119 on Jun. 11, 2013, now Pat. No. 10,532,498.

(30) Foreign Application Priority Data

Jun. 12, 2012   (JP) ................................. 2012-133241

(51) Int. Cl.
    *B29C 43/18*         (2006.01)
    *B60B 5/02*          (2006.01)
    (Continued)

(52) U.S. Cl.
    CPC .............. *B29C 43/18* (2013.01); *B29C 33/54* (2013.01); *B29C 43/36* (2013.01); *B29C 70/345* (2013.01);
    (Continued)

(58) Field of Classification Search
    CPC ........ B29C 43/18; B60B 5/02; B29L 2031/32
    See application file for complete search history.

(56) References Cited

U.S. PATENT DOCUMENTS

| 4,294,639 A | 10/1981 | Woelfel et al. |
| 4,514,013 A | 4/1985 | Woelfel et al. |

FOREIGN PATENT DOCUMENTS

| FR | 588657 A | 5/1925 |
| GB | 587 282 A | 4/1947 |

(Continued)

OTHER PUBLICATIONS

International Search Report dated Oct. 8, 2013 for International Application No. PCT/JP2013/066119.

(Continued)

*Primary Examiner* — Larry W Thrower
(74) *Attorney, Agent, or Firm* — Morgan, Lewis & Bockius LLP

(57) ABSTRACT

The present invention applies to a molding method for a fiber-reinforced plastic structure having an internal cavity. Firstly, grain groups, which mainly consist of a plurality of high-rigidity grains, are accommodated in bags, and a plurality of cores are formed. A reinforcing fiber substrate, is placed between the plurality of adjacent cores so as to be interposed therebetween. For example, a plurality of molding base materials are prepared by surrounding each core with a prepreg, and the plurality of molding base materials are combined and placed inside a molding die, and the molding base materials are compression molded. When compression molding, a part of the outer surface of the cores is locally pressurized, and the internal pressure of the cores is increased, changing the shape thereof, thus eliminating voids that are present between the cores and the prepreg and/or the prepreg and the molding surface of the die.

5 Claims, 5 Drawing Sheets

(51) Int. Cl.
*B29C 43/36* (2006.01)
*B29C 33/54* (2006.01)
*B29C 70/34* (2006.01)
*B29L 22/00* (2006.01)
*B29K 105/12* (2006.01)
*B29K 105/08* (2006.01)
*B29L 31/32* (2006.01)

(52) U.S. Cl.
CPC ........ *B60B 5/02* (2013.01); *B29C 2043/3605* (2013.01); *B29C 2043/3665* (2013.01); *B29C 2043/3668* (2013.01); *B29K 2105/089* (2013.01); *B29K 2105/12* (2013.01); *B29L 2022/00* (2013.01); *B29L 2031/32* (2013.01); *B60B 2310/204* (2013.01); *B60B 2360/344* (2013.01); *B60B 2360/346* (2013.01); *B60B 2360/3412* (2013.01); *B60B 2360/3414* (2013.01); *B60B 2360/3416* (2013.01)

(56) References Cited

FOREIGN PATENT DOCUMENTS

| | | |
|---|---|---|
| JP | S55-133949 A | 10/1980 |
| JP | 02-238912 A | 9/1990 |
| JP | 04-294132 A | 10/1992 |
| JP | 07-100856 A | 4/1995 |
| JP | 2011-152753 A | 8/2011 |
| JP | 2012-111100 A | 6/2012 |
| JP | 2012-187730 A | 10/2012 |

OTHER PUBLICATIONS

European Search Report issued in corresponding European Patent Application No. 13804303.9 dated Nov. 6, 2015.

MOLDING METHOD FOR
FIBER-REINFORCED PLASTIC STRUCTURE
AND VEHICLE WHEEL

This application is a divisional of U.S. patent application Ser. No. 14/406,768 filed on Dec. 10, 2014, which is hereby incorporated by reference. This application also claims the benefit of PCT/JP2013/066119 filed on Jun. 11, 2013 and Japanese Patent Application No. 2012-133241 filed on Jun. 12, 2012.

TECHNICAL FIELD

The present invention relates to a molding method for a fiber-reinforced plastic (FRP) structure having a closed cross-section by using cores, and representatively relates to a molding method for a vehicle wheel made of a fiber-reinforced plastic and a vehicle wheel obtained by the molding method.

BACKGROUND ART

A fiber-reinforced plastic structure having a closed cross-section is widely used in a range from large structures such as the body or wings of an aircraft to small structures such as a bicycle frame, tennis racket, a fishing rod, and a golf shaft. In addition, a fiber-reinforced plastic structure having an open cross-section is widely used for helmets and the like.

As a core for forming the closed cross-section, a core formed into a predetermined shape by wrapping a powder particles and/or a group of grains (herein after, a powder grain group) in a packaging film and vacuum-packaging the result, a core using a molded product formed by blow molding, and the like are used. In a related art in which the core having the vacuum-packaged powder grain group formed into a predetermined shape is used, for example, a molded body having a hollow portion and a molding method for the same which are disclosed in JP 2-238912 A (Patent Document 1) are proposed, and as the core formed by the blow molding, for example, a multilayer plastic molded body and a manufacturing method for the same of JP 7-100856 A (Patent Document 2) are proposed.

As Conventional Example 1 of the invention, the invention described in Patent Document 1 will be described with reference to FIGS. 8 and 9. FIG. 8 illustrates an intermediate state in molding a structure having a hollow portion which is a type of closed cross-section by a mold 30. That is, FIG. 8 illustrates a state where a sheet-like fiber-reinforced thermoplastic resin material (lower FRTP) 34 which is subjected to pre-heating to be in a molten state is placed on a lower mold 31 of the molding mold 30. Since the lower FRTP 34 is in the molten state, the lower FRTP 34 is hung under its own weight and enters a state of being depressed in the concave portion of the lower mold 31. FIG. 9 schematically illustrates the state illustrated in FIG. 8.

A core 33 formed by wrapping a powder grain group 33a in a packaging material 33b and solidifying the result into a predetermined shape by vacuum packaging basically has a structure illustrated in FIG. 9 and is placed in the concave portion of the lower FRTP 34 that is hung under its own weight in the molten state. On the upper portion of the lower FRTP 34 in which the core 33 is placed, another sheet-like FRTP, the upper FRTP 35 which is pre-heated to be in a molten state is placed. In this state, the periphery of the core 33 is in a state of being enclosed by the lower FRTP 34 and the upper FRTP 35.

An upper mold 32 of the mold 30 is lowered from this state to pressurize the upper FRTP 35 and the lower FRTP 34 between the upper mold 32 and the lower mold 31 to integrally solidify such that the upper FRTP 35 and the lower FRTP 34 are integrally molded in a state of wrapping the core 33 therein. In order to discharge the core 33 from the semi-finished product completed here, small holes are bored through the semi-finished product. When holes are bored through the semi-finished product, air infiltrates into the powder grain group 33a of the vacuum-packaged core 33 and the binding of the powder grain group 33a is loosened.

In addition, the powder grain group 33a included in the core 33 is discharged to the outside of the semi-finished product through the small holes formed in the semi-finished product, thereby completing a molded article. If the packaging material 33b which vacuum-packages the powder grain group 33a is made of a material having good releasability from the molded article, the packaging material 33b may be easily detached from the molded article.

As Conventional Example 2 of the invention, the invention described in Patent Document 2 will be described with reference to FIG. 10. FIG. 10 illustrates a state where a core molded by blow molding is set between molds 41a and 41b for molding an outer layer. As illustrated in FIG. 10, the molds 41a and 41b are configured to accommodate a core 43, and when the molds 41a and 41b are closed, a cavity as a hollow portion is formed to be filled with a molten resin between respective molding surfaces 42a and 42b of the molds 41a and 41b and the core 43.

Molten resin 45 which is plasticized by an extruder 44 is supplied into the cavity. By supplying the molten resin 45 into the cavity of the molds 41a and 41b in the closed state, a product having a hollow portion can be molded into a desired shape. However, in a case where the heat resistance of the core 43 is low compared to the temperature of the molten resin or in a case where the thickness of the core 43 is small, the core 43 may be deformed depending on the pressure applied to the core 43 at the time of molding. In addition, in a case a wide flat part is present as the shape of the core 43, the rigidity of the flat part is likely to be insufficient, and thus the core 43 may be deformed.

In order to prevent the deformation of the core 43, in the invention described in Patent Document 2, a configuration in which the internal pressure of the core 43 can be increased is employed. As a configuration for this, a pressurizing unit 46 which communicates with the inside of the core 43 is provided, and pressurized gas or liquid is introduced into the core 43 from the pressurizing unit 46 to increase the internal pressure of the core 43.

CITATION LIST

Patent Document

Patent Document 1: JP 2-238912 A
Patent Document 2: JP 7-100856 A

DISCLOSURE OF THE INVENTION

Problem to be Solved by the Invention

However, in the invention disclosed in Patent Document 1, in a state where the core 33 is interposed between the lower FRTP 34 and the upper FRTP 35, the lower FRTP 34 and the upper FRTP 35 are pressurized between the upper mold 32 and the lower mold 31 by lowering the upper mold 32. However, when the core 33 is placed in the concave portion of the lower FRTP 34, which has been formed by being depressed into the concave portion of the lower mold 31, and/or when the core 33 is covered with the upper FRTP 35 from above, voids are formed between the corner portions of the concave portion of the lower mold 31 and the lower FRTP 34 and/or between the core 33 and the lower and upper FRTPs 34 and 35.

When the pressurization is performed by the upper mold 32 and the lower mold 31 in the state where the voids remain, the lower FRTP 34 and the upper FRTP 35 cannot be sufficiently supported by the core 33 from the inside, and particularly, in a part of the lower FRTP 34 formed along the same direction as the vertical direction in which the upper mold 32 moves, that is, in a vertical part, a change in thickness occurs. Moreover, the shape of the outer surface of the lower FRTP 34 may not be formed into a shape that follows the shape of the corner portion of the concave portion of the lower mold 31, resulting in wrinkles may appear in the outer surfaces, or in buckled shapes in the vertical direction. Or, the vertical part may be molded in a compressed state in which the length thereof is shorter than the specified length, resulting in the degradation of dimensional accuracy of products.

Particularly, when the lower FRTP 34 and the upper FRTP 35 are made of a long fiber reinforced resin material using long fibers, in a case where pressure molding is performed while voids are present between the core 33 and the lower and upper FRTPs 34 and 35 or between the upper and lower molds 32 and 31 and the lower and upper FRTPs 34 and 35, the fiber orientation of the long fibers is disordered and bends thereof occur, resulting in the degradation of the strength as the fiber-reinforced plastic and deterioration of the appearance of molded products.

These problems are described in more detail using FIG. 9 which illustrates Conventional Example 1. In FIG. 9, a sheet-like thermosetting resin material containing reinforcing fiber (prepreg) 36 is used, and the above-mentioned vertical part is denoted by reference numeral 37. FIG. 9 illustrates a state where the annular prepreg 36 having the core 33 disposed therein is accommodated in the concave portion formed in the lower mold 31 and where the upper mold 32 is lowered toward the lower mold 31.

As illustrated in FIG. 9, the prepreg 36 having the core 33 disposed therein is interposed between the upper mold 32 and the lower mold 31 to be heated and pressurized, thereby being molded to be a semi-finished product in which the core 33 is accommodated. Small holes are bored through the completed semi-finished product and the powder grain group included in the core 33 is discharged to the outside through the small holes, thereby completing a hollow molded article.

However, in the case the core 33 is placed in the concave portion formed in the prepreg 36 accommodated in the lower mold 31, voids are easily formed between the outer surface of the core 33 and the inner circumferential surface of the prepreg 36, for example, in a case where the semi-finished product is to be molded into a shape having angular portions. Particularly, when some space is provided between the mold and the prepreg 36 in order to smoothly insert the prepreg 36 into the mold, the space may cause voids between the corner portions of a molding surface and the prepreg 36.

When the prepreg 36 is heated and pressurized by lowering the upper mold 32 toward the lower mold 31, winkles and bends may occur in the vertical part 37 of the prepreg 36 due to the influence of the voids, and thus the angular portions of the outer surface side of the prepreg 36 may not be formed into a desired right-angled shape i.e. the prepreg 36 in the mold may remain to be not charged state, resulting in the formation of voids. When a product having a particularly complex structure is to be molded, it is extremely difficult to form a core into a shape that follows the shape of the product having such a complex structure.

When the amount of the powder grain group included in the core 33 is small, voids may be formed between the prepreg 36 and the core 33, and bends may occur in the vertical part 37 of the prepreg 36. That is, as illustrated in FIG. 9, a portion of the vertical part 37 is deformed into a shape that is curved toward the core 33. Moreover, in a case where the fluidity of the powder grain group included in the core 33 is low, the influence of the deformation becomes significant. Even if a portion of the vertical part 37 is not curved toward the core 33, as long as the lowering amount of the upper mold is not restricted, the vertical part 37 may be compressed so that the length in the vertical direction thereof is shorter than a specified length as illustrated in FIG. 9.

In the invention described in Patent Document 1, in order not to produce defective products, enhancement of the precision in preforming the prepreg 36 and/or pre-forming of the core 33 into a desired shape is necessary so that no void is formed between the prepreg 36 and the core 33. However, configuring the core 33 by measuring the amount of the powder grain group included in the core 33 precisely to the required amount, forming the shape thereof into the desired shape and then bringing the prepreg 36 into close contact with the core 33 to allow the shape of the external form of the prepreg 36 to follow the inner surface shape of the mold needs much time and effort due to the instability of the shapes of the powder grain group that is not completely fixed and of the uncured prepreg.

In the invention described in Patent Document 2 illustrated in FIG. 10, the internal pressure of the core 43 may be increased by introducing pressurized gas or liquid into the core 43. The pressurized gas or liquid has a physical property in which pressures at an arbitrary point become the same in all directions. Therefore, a portion of the gas or liquid pressurized to increase the internal pressure leaks from the core 43, the leaking gas or liquid becomes a high-speed and high-pressure jet stream and is ejected to the outside through the gap between the molds 41a and 41b while being in a high temperature state. Particularly, in a case where the liquid is ejected, there is concern that the periphery of the molds may be significantly damaged or the safety of an operator may be damaged. Therefore, a facility considering sufficient safety measures is needed.

The present invention solves the above-described problems in the related art, and an object thereof is to provide a molding method for a fiber-reinforced plastic structure, particularly a method which is suitably applied to a vehicle wheel, and a vehicle wheel obtained by the molding method capable of uniformly increasing a pressure between prepregs and cores without using gas or liquid during molding of a molded article having a closed cross-section by using a molding die, particularly a molded article having a complex structure, and capable of, even in a case where pressure is applied to the cores or a typical molding die is used, preventing the leakage of a portion of a constituent material of the cores from the molding die.

Means for Solving Problem

In order to solve the problems, in the present invention, cores formed by accommodating a grain group containing a large number of high-rigidity grains in bags made of a flexible material are used. As the bags, a plastic film or a hollow plastic structure molded by blow molding may be used. In a case where the plastic film is used as the bag, a predetermined amount of grain group is measured into each of a plurality of bags made of plastic film to be formed into a predetermined shape, and the inside of the bag is suctioned to be vacuum-packaged, thereby forming a core that maintains a predetermined shape. In a case where the hollow plastic molded body which is molded into a predetermined shape by blow molding is used as the bag, a grain group is transferred into the hollow plastic molded body through holes bored through a portion of the wall surface of the hollow plastic molded body to fill the space in the hollow plastic molded body, thereby forming a core that maintains a predetermined shape.

A first embodiment of a molding method for a fiber-reinforced plastic structure having a plurality of hollows of the present invention mainly includes: forming a plurality of cores by filling each of the plurality of bags made of a flexible material with a large number of grains mainly containing high-rigidity grains; disposing the cores in close contact with one surface of a prepreg laminate including one or more prepregs; disposing the other cores in close contact with the other surface of the prepreg laminate; curing the resin impregnated in the prepreg; and removing the high-rigidity grains filling the cores from the bags.

According to a preferable aspect, curing the resin in a state where the prepregs that accommodate the cores are pressurized in a cavity of a molding die is included. In this embodiment, it is preferable that pressing a portion of an outer circumferential surface of at least one core with pressing means which comes in and out of the cavity of the molding die, and deforming the core by increasing an internal pressure of the core; and increasing cohesion of the prepregs to the mold and all the cores disposed in the cavity in the molding die by the deformation of the cores due to the pressing be included.

In a case where the fiber-reinforced plastic structure has a plurality of hollows having symmetry, it is preferable that in order to press a portion of an outer circumferential surface corresponding to each of the plurality of cores selected to be symmetrical, a mold block be inserted into the cavity of the molding die along the molding die to perform the pressing. It is preferable that the grain group contain grains having different diameters, and it is preferable that the grain group contain high-rigidity grains and elastic grains.

In this embodiment, further disposing an independent metal member (not illustrated) in the molding die; and molding the metal member integrally with the prepregs may be included. In addition, after molding the metal member and the prepregs integrally with each other by the molding die, the grain group may be discharged to outside of a molded product through the metal member.

In addition, a second embodiment of a molding method for a fiber-reinforced plastic structure having a plurality of hollows of the present invention mainly includes: forming a plurality of cores by filling bags made of a flexible material with a large number of grains mainly containing high-rigidity grains; disposing the cores in close contact with one surface of a reinforcing fiber base material; disposing the other cores in close contact with the other surface of the reinforcing fiber base material; allowing the reinforcing fiber base material to be impregnated with a resin and curing the resin; and removing the high-rigidity grains filling the cores from the bags.

In the second embodiment, it is also preferable that the resin be cured in a state where the reinforcing fiber base material that accommodates the cores is pressurized in a cavity of the molding die. In addition, preferably, pressing a portion of an outer circumferential surface of at least one core with pressing means which comes in and out of the cavity in the molding die; deforming the core by increasing an internal pressure of the core; and increasing cohesion of prepregs to the mold and all the cores disposed in the cavity in the molding die by the deformation of the cores due to the pressing may be included. More preferably, a metal member as described above may further be disposed in the cavity of the molding die, and the reinforcing fiber base material and the metal member may be molded integrally with each other.

A third embodiment of the present invention is a vehicle wheel manufactured according to the molding method for a fiber-reinforced plastic structure having a plurality of hollows.

Effect of the Invention

In the present invention, the grain group which contains a large number of high-rigidity grains and has high fluidity is accommodated in each of a plurality of bags shaped into desired three-dimensional shapes by blow molding, vacuum molding, injection molding, or the like, and the results are used as molding cores. The plurality of molding cores are not disposed to be simply adjacent to each other along the shapes of the hollows of the fiber-reinforced plastic structure but are disposed in close contact with the prepregs or the reinforcing fiber base substrate (hereinafter, simply referred to as reinforcing fiber substrate) interposed between the adjacent molding cores. Even in the complex hollow arrangement of the completed product from which the molding cores are detached, the fiber-reinforced plastic molded products are integrally disposed between the plurality of hollows and integrally interposed between the plurality of hollows having complex arrangements and shapes. Accordingly, a fiber-reinforced plastic structure having a complex structure can be obtained and the fiber-reinforced plastic structure can be provided with necessary strength and shape stability.

Moreover, during the molding using the molding die, the outer surface of the portion of at least one core is pressed via the reinforcing fiber substrate or not via the reinforcing fiber substrate, and thus a slip forcibly occurs between the grains of the grain group included in each of the cores such that the core is deformed to increase its outer surface. Since the outer surface of the core is increased, even when voids are formed between the reinforcing fiber substrate that wraps the core and the core, the voids can be filled by the deformation of the core. Particularly, even when voids occur between the corner portions of the molding surface of the molding die and the reinforcing fiber substrate, the reinforcing fiber substrate can be moved in a direction in which the voids are filled by the deformation of the core, thereby eliminating the occurrence of voids.

The voids formed between the reinforcing fiber substrate and the core are crushed by a high internal pressure of the core due to the deformation of the core and air filling the voids is discharged to the atmosphere from the molding die through the reinforcing fiber substrate. Passages formed by the air that passes through the reinforcing fiber substrate may be naturally filled with the resin which is in a molten state after the air passes.

The core is configured by accommodating a grain group containing a large number of grain groups containing high-rigidity grains therein. Therefore, even when the core is deformed by pressing a portion of the outer surface of the core so that the surface area of the outer circumference of the core increase, the internal pressure of the core is not in a uniform pressure state in all portions as in the case where liquid or gas is used as long as a special method is not considered. That is, even when a pressure is applied to one portion of the grain group, the pressure in other one portion is smaller than pressures applied to the former one portion. When the applied pressure is higher than a certain value, the grains constituting the grain group slip on each other.

That is, when the outer surface of the portion of the core is pressed, the pressed portion of the core is crushed. Therefore, even when the internal pressure of the pressed portion is significantly increased, an increase in pressures of portions of the core distant from the above portion becomes lower than that in the internal pressure of the pressed portion.

Particularly, the transmission of the pressure in the core and the fluidity of the grain group are affected by the shapes of the grains constituting the grain group, the roughness of the surface of the grain, and the grain diameter. When a grain group constituted only by grains having uniform grain diameters is used, the grains are packed in the core at a high density and thus the fluidity of the grain group is degraded, resulting in the degradation of the transmission of the pressure. Therefore, by considering the distribution state of the grain diameters of the core and the distribution state of the surface roughnesses of the grains or by combining grains having different grain diameter to prevent the state in which the grains are packed at a high density, the fluidity of the grain group and the pressure transmission in the core are enhanced. Furthermore, even by using a grain group containing high-rigidity grains and elastic grains as the grain group, the fluidity of the grain group and the pressure transmission in the core can be enhanced.

Even in the portions of the core distant from the pressed portion, the core is deformed by slipping of the grains constituting the grain group so that the surface area of the outer circumference of the core is increased. Accordingly, the reinforcing fiber substrate can be pressed against the molding surface of the molding die, and for example, a pressure between the cores that support a vertical part of the reinforcing fiber substrate in a vertical direction parallel to the pressing direction of the mold can be increased. Thus, during the pressurization by an upper mold and a lower mold, the vertical part as described above can be prevented from being bent and deformed.

Furthermore, by fixing the closed position of the molding die to cause the length of the above-mentioned vertical part in the vertical direction to be the specified length before pressing a portion of the core, the pressure between the outer surface of the core and the inner surface of the reinforcing fiber material is increased. Accordingly, a situation in which the length of the above-mentioned vertical part in the vertical direction is compressed and shorted to be equal to or smaller than a predetermined length can be avoided, and thus a reinforcing fiber substrate can be molded into a desired thickness.

In addition, even in a case where the angular portion of the outer surface of the reinforcing fiber substrate is formed as, for example, an angular portion at a right angle or an acute angle, a sufficient amount of the reinforcing fiber substrate can be moved to the corner portion of the molding die which molds the angular portion, so that a fiber-reinforced plastic structure having an outer surface filled with the reinforcing fiber substrate even in the angular portion can be molded.

When the internal pressure of the core is increased, the grains constituting the grain group slip and move in all directions. However, the bag containing the grain group is made of an extendible material. Therefore, due to the extendible bag, the deformation of the outer shape of the core due to the movement of the grain group can be allowed.

Even in a case where the grain group breaks the bag due to the fastening of the molding die or an increase in the pressure of the grain group caused by the pressing of the core, when the open gap of the molding die is smaller than the diameters of the grains constituting the grain group, the grains do not leak from the molding die as long as the grains are not crushed. However, in a situation in which the grains are crushed and leak out from the molding die, the hollows of the obtained fiber-reinforced plastic structure may be deformed, and the shape of the fiber-reinforced plastic structure may be forcibly affected. Therefore, in the present invention, a high-rigidity material is used for the grains.

As means for pressing a portion of the outer surface of the core, a configuration in which the mold block which comes in and out of the cavity of the molding die may be employed. The mold block forms a portion of the molding die and is made of a metal block which comes in and out of the molding surface of the molding die. For example, as the mold block, a plunger or a metal block having a mechanism that can slide a portion of the inner surface of the mold by an external operation is used. The most distinctive feature of the molding method for a fiber-reinforced plastic structure according to the present invention is that the arrangement of the reinforcing fiber substrate and the plurality of cores is specified as described above by using the plurality of cores having relatively simple shapes when the fiber-reinforced plastic structure having the plurality of hollows with complex structures and symmetrical shapes is molded. By combining the cores, a molding method capable of efficiently molding a fiber-reinforced plastic structure having a complex structure with a closed cross-section that secures necessary strength at high accuracy is realized. As described above, since the plurality of cores are used in the present invention, the pressing means is installed at a portion or a plurality of portions of the molding die to correspond to the pressed portion of each of the cores that needs to be pressed.

In the present invention, in a case where the outer surface of the portion of the core is pressed, when the outer surface of the portion of the core is pressed via the reinforcing fiber substrate, a concave portion is formed in the reinforcing fiber substrate. It is preferable that holes be bored through the concave portion formed in the pressed portion to discharge the grain group included from the semi-finished product. In addition, when the pressed place has a substantially flat shape, in a case where the entirety of the flat surface is pressed via the reinforcing fiber substrate, the entire surface becomes depressed, and thus a concave portion is not substantially formed. The discharge holes through which the grain group included in the core is discharged may be provided in the concave portion or flat surface portion which is the pressed portion or at arbitrary positions other than the pressed portion.

In addition, in a case where the outer surface of the portion of the core is pressed not via the reinforcing fiber substrate, holes having sizes corresponding to the pressing portion such as the mold block are bored through the reinforcing fiber substrate in advance and the core is directly pressurized through the holes. In this case, the bag may be broken from the hole positions formed in the molded product to discharge the grains.

MODES FOR CARRYING OUT THE INVENTION

Hereinafter, exemplary embodiments of the present invention will be described in detail with reference to the accompanying drawings. A molding method for a fiber-reinforced plastic structure according to the present invention includes configurations such as a molding die and a set of cores described below, and the configurations can be modified in various forms as long as the configurations can widen the outer surface area of the cores in the process of the pressure molding using the molding die. Furthermore, the invention can also be easily applied to large molded products by increasing the number of constituent unit cores included in the set of cores.

A molding method for a vehicle wheel made of fiber-reinforced plastic, which is a representative molded product of a fiber-reinforced plastic structure, will be described below. In addition, as a matter of course, the molding method for a fiber-reinforced plastic structure of the present invention is not limited to the molding method for a vehicle wheel and may also be applied to large molded products such as the vehicle body of a car or a train, the body or wings of an aircraft, and the like.

Figure 1:
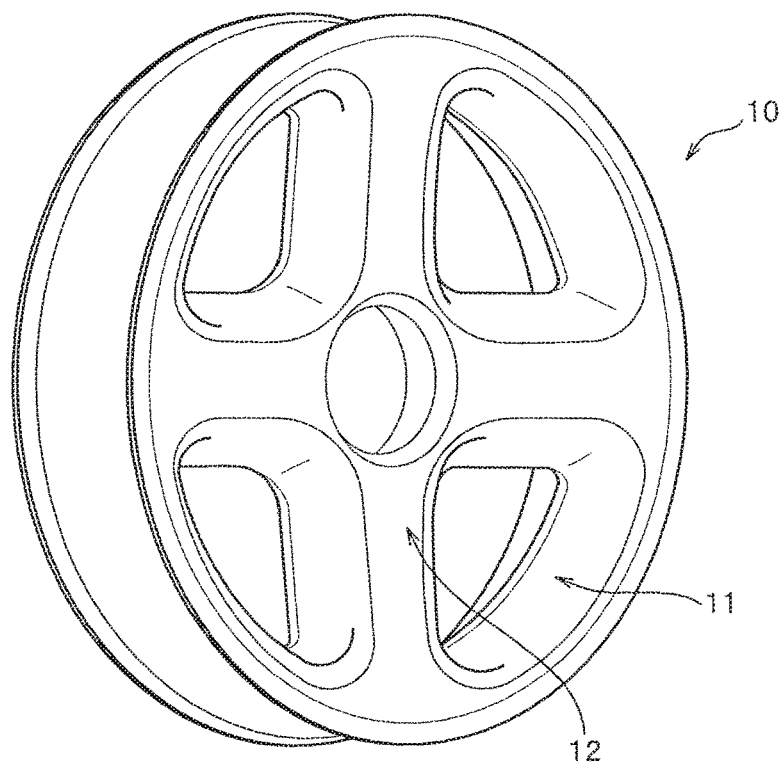
FIG. 1 is a front perspective view illustrating an example of a vehicle wheel molded according to the present invention.
Figure 2:
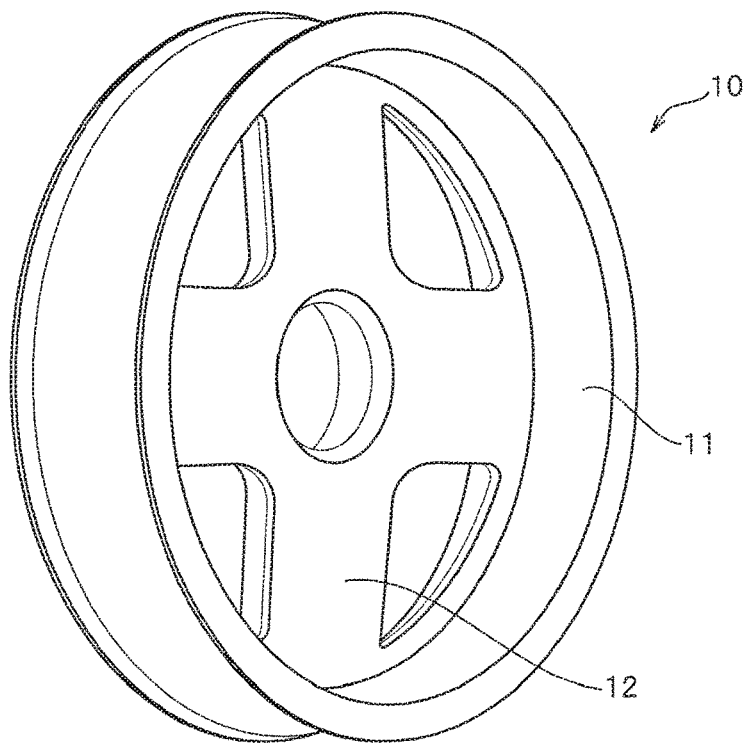
FIG. 2 is a rear perspective view of the vehicle wheel.

FIGS. 1 and 2 illustrate a vehicle wheel 10 made of a fiber-reinforced plastic molded product. The vehicle wheel 10 has a plurality of hollows therein for weight reduction. In order to form the hollows in the vehicle wheel 10, a plurality of cores 4 are used. In this embodiment, the cores 4 of the entire wheel are divided into four sections along the line IV-IV and the line V-V, and four cores 4a to 4d are used for the rim portion 11, and four cores 4e to 4h are used for the disk portion 12, thereby forming a total of eight divided cores 4a to 4h.

Therefore, a total of eight hollows are formed in the vehicle wheel 10 obtained by using the divided cores 4a to 4h.

Figure 7:
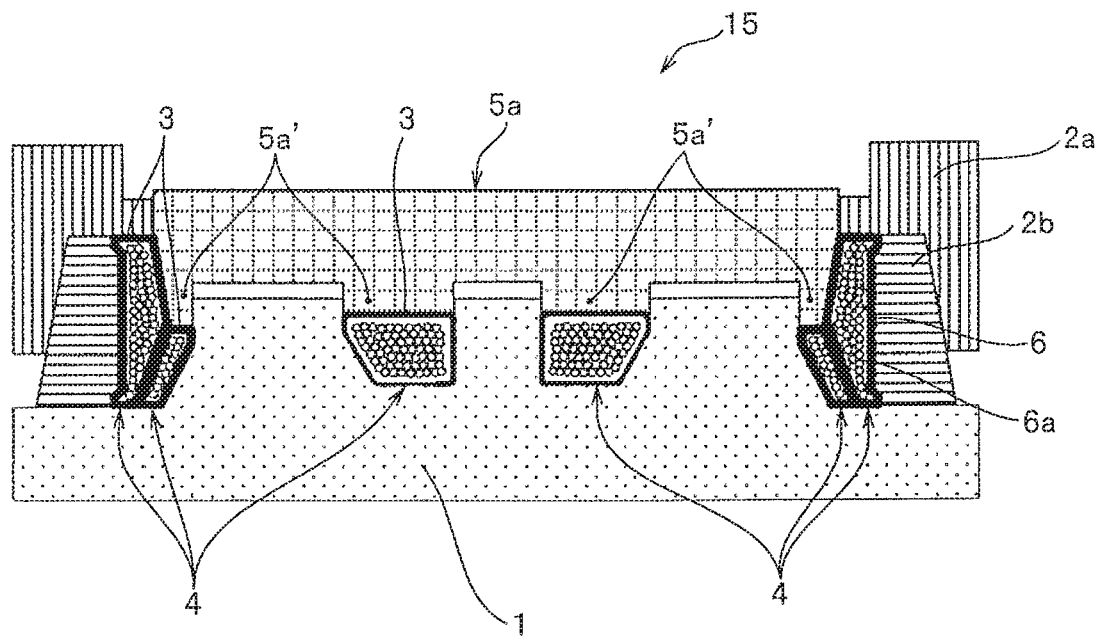
FIG. 7 is a transverse cross-sectional view of molds and the fiber reinforced substrate during molding of the vehicle wheel.
Figure 8:
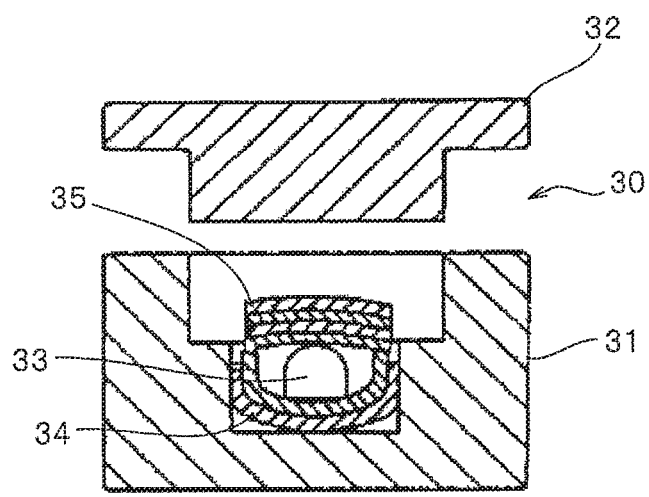
FIG. 8 is a view illustrating an initial state of molding of a molded product having a hollow portion, which represents Conventional Example 1.
Figure 9:
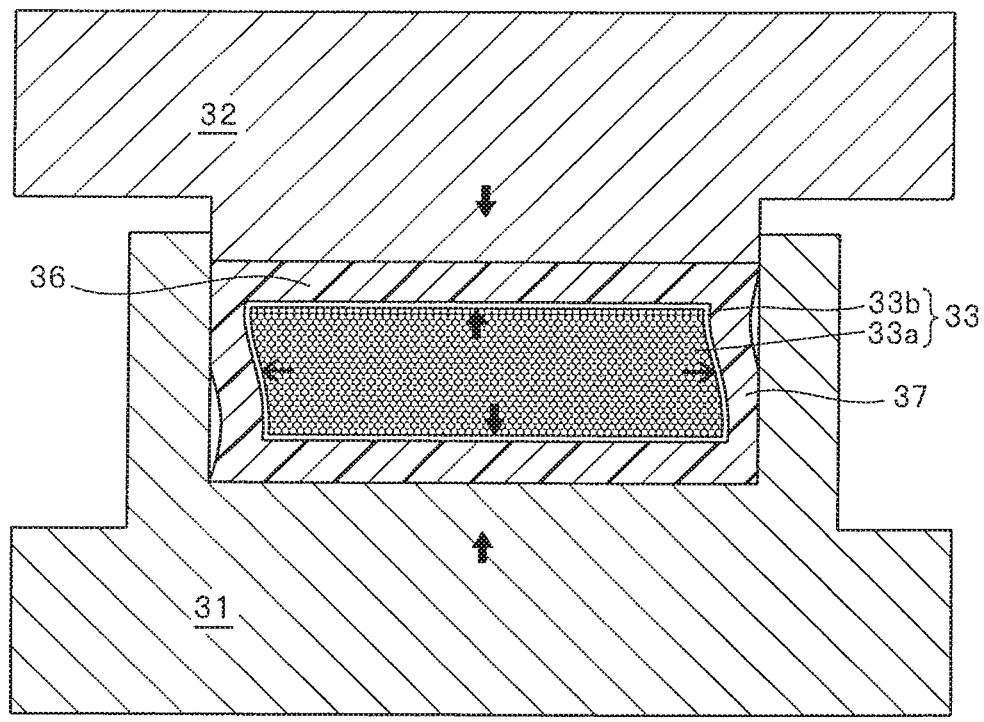
FIG. 9 is a cross-sectional view schematically illustrating a state during pressure molding of FIG. 8.
Figure 10:
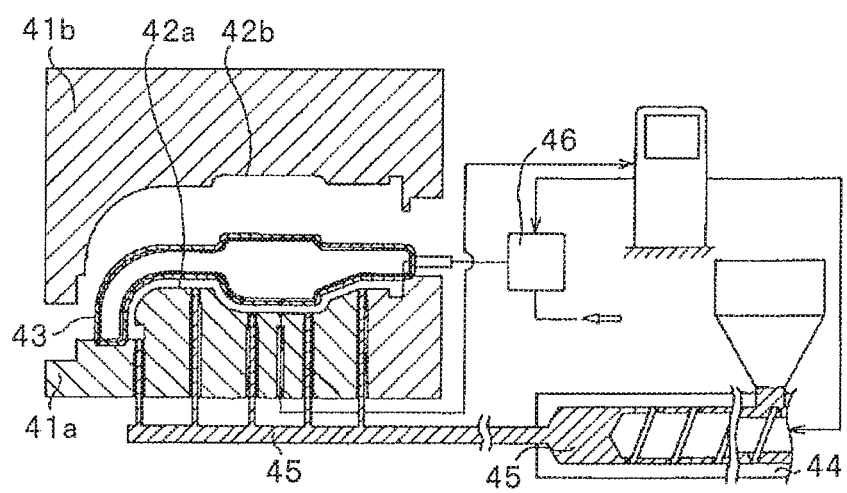
FIG. 10 is a system diagram illustrating a state where a core is set between molding molds, which represents Conventional Example 2.

The divided cores 4a to 4h are made by filling bag-like molded products (bags) produced by blow molding with high-rigidity grains or a mixture of high-rigidity grains and elastic grains. In the present invention, the divided cores 4a to 4h are not only simply arranged along the shapes of the hollows formed in the vehicle wheel 10 but also arranged with prepregs between them. Specifically, as illustrated in FIG. 7, for example, the divided core 4a of the rim portion 11 is disposed in close contact with one surface of a prepreg 3 disposed in a predetermined region of a lower mold 1, the adjacent divided core 4e of the disk portion 12 is disposed in close contact with the other surface of the prepreg 3, and the entire surfaces of the divided cores 4a and 4e are covered with the prepreg 3. The remaining divided cores 4b to 4d of the rim portion 11 and the remaining divided cores 4f to 4h of the disk portion 12 are brought into close contact and covered with the corresponding prepregs 3 like the divided cores 4a and 4e.

The prepregs 3 that cover each of the divided cores 4a to 4h are disposed in corresponding places to each of them in the cavity formed by a lower mold 1 with a side mold 2b illustrated in FIG. 7 to come into close contact therewith. After this arrangement, an upper mold 2a and a mold block 5a are lowered together. While the upper mold 2a and the mold block 5a are lowered, the lower surface of the upper mold 2a and the protruding end surface of the lower surface of the mold block 5a abut on the prepregs 3 disposed in advance, and pressurization on the surfaces of portions of the prepregs 3 is started. Pressurization by the mold block 5a continues even after the upper mold 2a reaches the predetermined lower limit position. The lower limit position of the upper mold 2a during the lowering thereof is determined by the height of the position of the upper surface of the side mold 2b. However, the mold block 5a continues to press the surfaces of the prepregs 3 without colliding with the mold. During pressurization in which the upper mold 2a is lowered and reaches the lower limit position and the mold block 5a continues pressing, the resin impregnated in the prepreg layer is cured, thereby molding a fiber-reinforced plastic structure having a desired shape.

The upper mold 2a in this embodiment is to determine the position of the upper end flat surface which is a portion of the outer surface of the rim portion 11 of the vehicle wheel 10 as illustrated in FIG. 7, and the mold block 5a is used exclusively for pressurizing a portion of the upper surface of the disk portion 12 of the vehicle wheel 10 using the protrusions 5a' thereof as illustrated in FIG. 7. In addition, pressure during the pressurization by the mold block 5a is transferred by the flow of a grain group filling the cores and becomes the force for the upper end flat surface of the rim portion 11 of the vehicle wheel 10 to press the upper mold 2a. However, the upper mold 2a is fixed so as not to be moved by the force. In this manner, the upper mold 2a, the mold block 5a, the side mold 2b, and the lower mold 1 pressurize the entirety of the prepregs 3 which include the eight divided cores 4a to 4h separately arranged in the cavities formed therein.

The prepreg 3 may be made as a sheet-like material by impregnating reinforcing fiber such as carbon fiber, glass fiber, aramid fiber, or silicon carbide fiber with uncured thermosetting resin. The type of the reinforcing fiber is selected depending on the target performance of the fiber-reinforced plastic structure.

In the illustrated embodiment, the plurality of divided cores 4a to 4h form the hollows adjacent with each other via the prepregs 3 that respectively cover the divided cores 4a to 4h. However, for example, a plurality of layers of prepregs 3 may be further added between the prepregs 3 which respectively cover each of divided cores 4a to 4h. In addition, the prepregs 3 which respectively cover the eight divided cores 4a to 4h are not necessarily simply set in the lower mold 1, however, the prepregs 3 which respectively cover the eight divided cores 4a to 4h may be combined and covered with a prepreg before being set in the lower mold 1.

Figure 3:
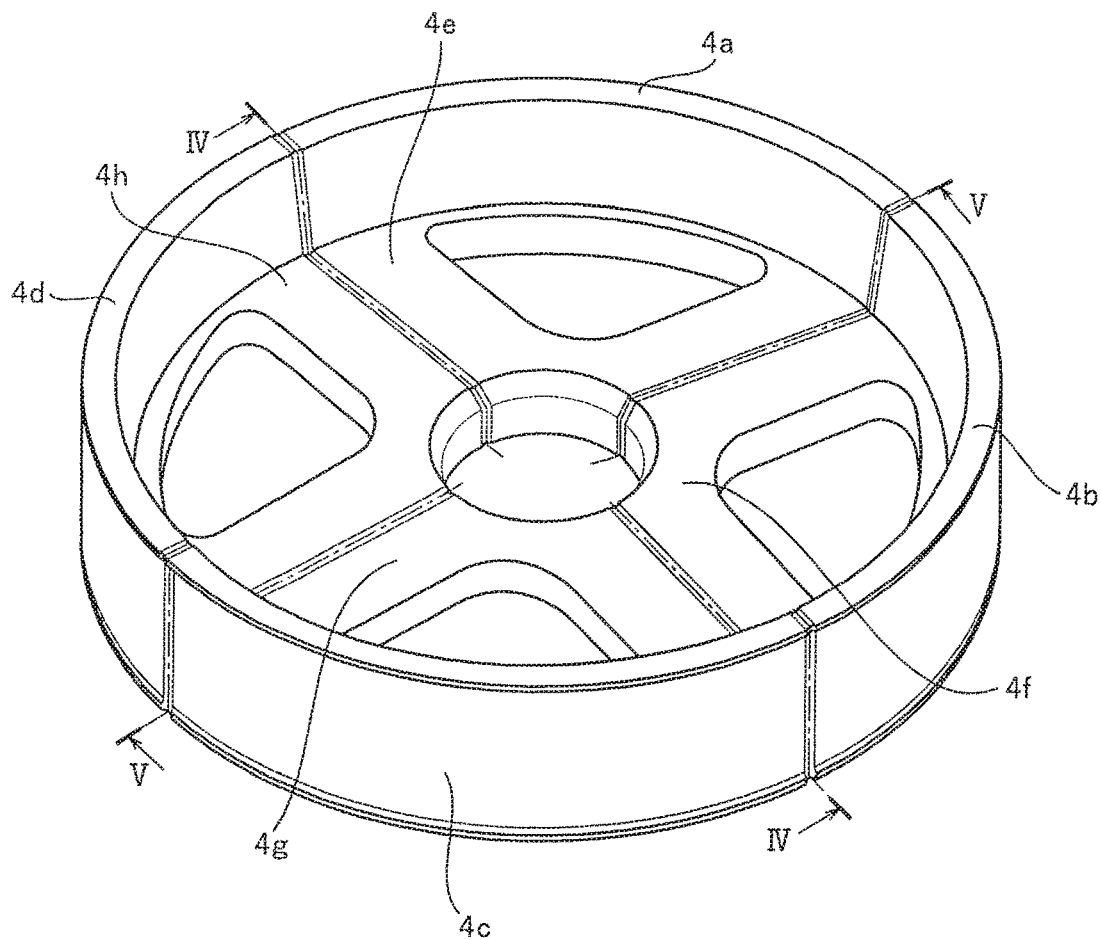
FIG. 3 is a rear perspective view illustrating an example of the overall arrangement of divided cores of the vehicle wheel.
Figure 4:
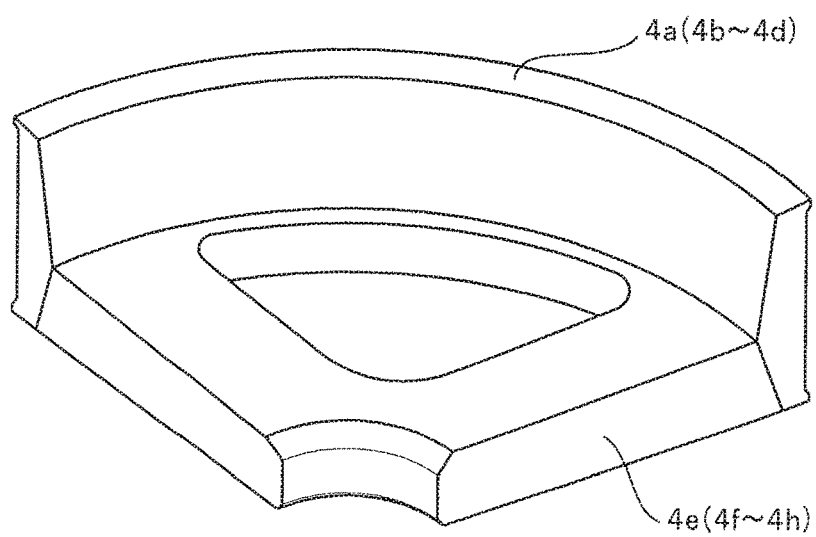
FIG. 4 is a rear enlarged perspective view illustrating a unit cross-section of the divided core of the vehicle wheel.
Figure 5:
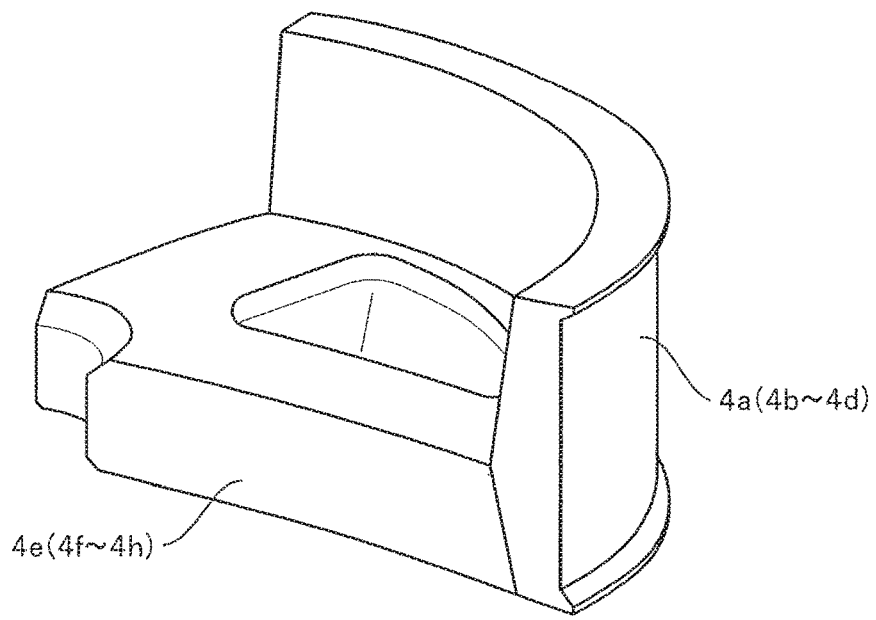
FIG. 5 is an enlarged perspective view illustrating an example of a molded, semi-finished product cut in the unit of the divided core of the vehicle wheel.

Moreover, in the embodiment illustrated in FIGS. 3 to 5, the direction in which the cores of the disk portion 12 are divided is the same as the direction in which the rim portion 11 is divided, but the dividing directions need not be the same with each other. The relative arrangement of the dividing directions may be selected so that the distribution of stress in use and the distribution of mass are optimized depending on the type of the fiber-reinforced plastic structure to produce.

Furthermore, according to the illustrated embodiment, the prepregs interposed between the divided cores 4a to 4h of the rim portion 11 and the disk portion 12 and the prepregs interposed between the divided cores 4a to 4d of the rim portion 11 and the divided cores 4e to 4h of the disk portion 12 are present. For this reason, by removing the divided cores 4a to 4h from the molded product after all the prepregs are cured, hollows are generated in the removed parts. However, the cured prepregs integrally remain between the adjacent hollows and connect the plurality of hollows connected in a complex arrangement, thereby securing the strength and the rigidity of the entire structure, and functioning as reinforcing ribs of other hollows themselves which are arranged in a complex arrangement.

The above description has been provided by using a thermosetting resin material. However, in a case where a prepreg impregnated with a thermoplastic resin instead of a thermosetting resin is used, a preform which is shaped by heating the prepreg 3 in advance may be pressurized and cooled by the molding die to manufacture an FRP molded product having a desired shape. Furthermore, instead of using prepregs, resin transfer molding may also be applied in which a plurality of cores are individually covered with a reinforcing fiber base material such as reinforcing fiber fabric to be disposed in the molding die, the molding die is then closed, and a thermosetting resin is injected to fill the cavity between the molding surface of the molding die and the reinforcing fiber base material that covers each of the cores under pressure to be cured in the molding die which performs heating.

As the thermosetting resin material impregnated in the fiber, epoxy resins, urea resins, vinylester resins, unsaturated polyester resins, polyurethane resins, phenolic resins, and the like may be used. As the thermoplastic resin material, polypropylene, polyethylene, polystyrene, vinyl chloride, polyamide resins, and the like may be used.

The core 4 is configured by filling a bag 6 such as a blow-molded product, a vacuum-molded product, or an injection-molded product which is shaped into a predetermined external form shape with a grain group having high rigidity. As high-rigidity grains constituting a grain group 6a, ceramics such as alumina and zirconia, glass, hard heat-resistant resins, metals, foundry sand, and the like may be used. When zirconia or quartz is used as the grains, these materials are appropriate materials due to their low thermal conductivity. As the material of the bag 6 used to hold the shape of the core 4, nylon, polypropylene, polyethylene, acrylic resin, a fluororesin film, silicone rubber, and the like may be used. In a case where the bags are not removed, nylon having excellent resin adhesion is appropriate. In addition, in order to enhance the adhesion of the bag, a corona discharge process or the like may be effectively used.

The mold block 5a forms a portion of the upper mold of the molding die 15 and the lower surface of the body thereof has a plurality of protrusions 5a' which are able to come in and out of the cavity of the molding die 15. In the illustrated example, the protrusions 5a' are formed integrally with the body, and are able to come in and out of the cavity of the molding die 15 while being integrated with the body. Therefore, a cylinder or a plunger (not illustrated) is connected to the body of the mold block 5a. The mold block 5a is configured to be tightly fitted to the inner circumferential surface of the upper mold 2a to be slidable. Here, the body of the mold block 5a and the protrusions 5a' may be configured to be separated from each other. In this case, the body of the mold block 5a and the protrusions 5a' may be independently provided with operating means such as a cylinder or a plunger.

Next, the molding method for a fiber-reinforced plastic structure which is an embodiment of the present invention will be described in detail with reference to the drawings by exemplifying the vehicle wheel.

First, in FIG. 3, mold materials (hereinafter, referred to as raw mold materials 3a to 3h) made by wrapping the eight divided cores 4a to 4h divided along the line IV-IV and the line V-V for the rim portion 11 and the disk portion 12 with prepreg are respectively placed at predetermined positions in the cavity formed by the lower mold 1 and the side mold 2b which is placed on the lower mold 1 and is movable in the horizontal direction. Here, the upper mold 2a is lowered toward the lower mold 1 and is fixed thereto with the side mold 2b interposed therebetween, thereby being clamped together. The raw mold materials 3a to 3h are heated from a point of time at which the raw mold materials 3a to 3h are placed in the lower mold 1 and can be efficiently heated over the entire circumferences due to the clamping. The pressure in this stage is not high and the pressure is increased by the mold block 5a in the subsequent stage. Therefore, a mold opening and closing mechanism may be provided as a clamper and a high-pressure press is unnecessary.

Subsequently, the mold block 5a is press-fitted into the cavity of the molding die 15 to press portions of the outer surfaces of the divided cores 4a to 4h covered with the prepregs 3 via the prepregs 3. Due to the pressing, a slip occurs between the grains constituting the grain group 6a in the core 4, and thus the grain group 6a flows and the core 4 is deformed such that the outer circumferential surface area of the core 4 is increased. When the outer circumferential surface area of the core 4 increases, the core 4 reaches the every corner of the inner surface of the prepreg 3 eliminating gaps where voids are particularly likely to occur, and the core 4 can be brought into close contact with the inner surface of the prepreg 3, thereby obtaining a molded product having high dimensional accuracy without bends or winkles.

That is, even when voids are formed between the prepreg 3 that wraps the core 4 and the core 4, air in the voids is pressurized under the high internal pressure by the core or is discharged to the atmosphere from the molding die 15 through the prepreg 3 due to the increased outer circumferential surface area of the core 4. Passages formed by the air that passes through the prepreg 3 may be naturally filled by the prepreg 3 which is melted after the air passes.

In addition, even in a case where voids are present between the molding die 15 and the prepreg 3 in the angular portions of the molding die 15, the prepreg 3 is pressed by the core 4 and moves toward the voids due to the increase in the outer circumferential surface area of the core. In addition, air in the voids is pressurized by the high internal pressure or is extruded into the atmosphere through the gaps between the molding die 15 and the prepreg 3. The prepreg 3 moves to parts as the voids from which air is extruded and is formed into a shape that follows the angular portion shape of the molding die 15. Accordingly, the molded product formed by heating and pressurizing the prepreg 3 can be a molded article in which the angular portion is formed at a right angle or at an acute angle or has an undercut shape.

In addition, in the drawings used for the description of the embodiment, for easy description of the bag 6, the thickness of the bag 6 is illustrated to be large in an exaggerated state. Actually, the bag 6 may be formed to be about 1 mm in thickness. Here, a configuration in which a vehicle wheel is molded is described. However, designs of disk shape, rim width, and the like may be appropriately applied, and as the molded product, a more complex structure, including other shapes having a closed cross-section or shapes having a combination of a closed cross-section and an open cross-section, can be molded.

As a shape similar to the closed cross-section, there is a shape having a C-shaped cross-section or the like. For example, in a case where a molded product having a C-shaped cross-section is to be formed, a configuration may be employed in which a portion of the core is allowed to directly abut on the molding surface of the upper mold 2a, the mold block 5a, or the lower mold 1. In addition, the periphery of the core which does not abut on the molding surface is covered with the prepreg 3, thereby molding a molded product having a C-shaped cross-section. Therefore, the closed cross-section in the present invention includes, in addition to a shape such as an angular pipe shape, for example, a C-shaped cross-section.

As illustrated in FIG. 7, by pressing one surface of the outer surfaces of the core 4 with the mold block 5a, the internal pressure in the core 4 can be increased without substantially forming a concave portion in the outer surface of the prepreg 3.

As the internal pressure of a portion of the grain group 6a included in the core 4 is increased, grains constituting the grain group 6a slip on each other and move in all directions and the grain group 6a extends toward a side where pressure is low. Since the bag 6 containing the grain group 6a is made of a relatively soft material such as a thermoplastic resin, the bag 6 does not substantially limit the movement of the grain group 6a and can extend to increase the outer circumferential surface area of the core.

In a case where voids are present between the core 4 and the prepreg 3 before the pressing by the mold block 5a, although the increase of the pressure of the grain group 6a in the vicinity of the void is slower than the increase of the pressure of a part with no voids during the pressing by the mold block 5a, the internal pressure of a portion of the grain group 6a included in the core 4 is increased to increase the outer circumferential surface area of the core 4, thereby eliminating the voids between the core 4 and the prepreg 3.

Moreover, since the enlargement of the outer surface area of the core 4 occurs in a part in which the pressure between the core 4 and the prepreg 3 is low and where voids are likely to occur, the thickness of the prepreg 3 can be maintained in a predetermined thickness while eliminating the voids.

As described above, products having a desired outer surface shape with a predetermined thickness can be pressure-molded.

Figure 6:
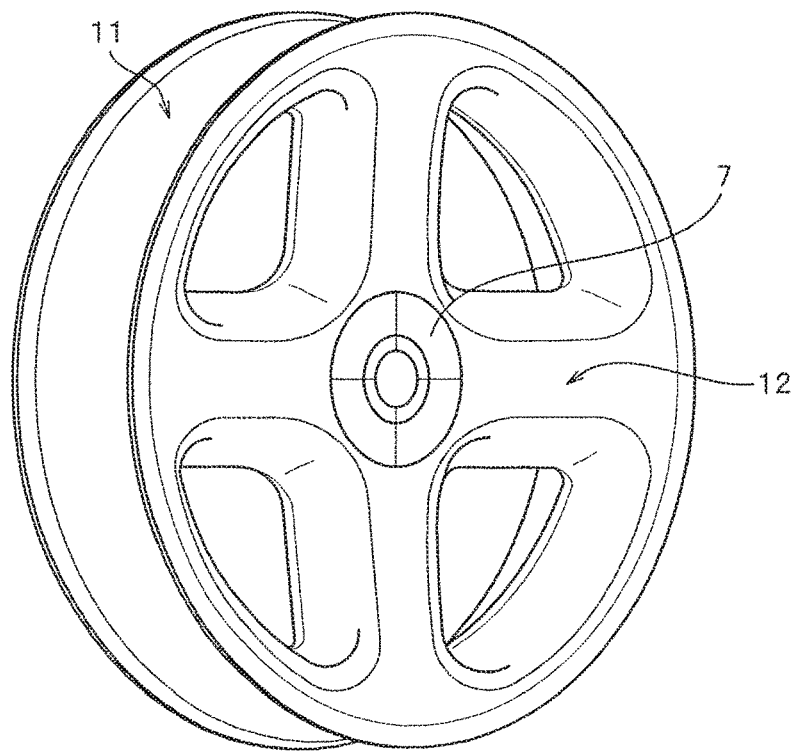
FIG. 6 is a front perspective view illustrating an example of a vehicle wheel molded integrally with an axle metal hub.

FIG. 6 illustrates a state where the semi-finished product which is pressure-molded by the molding die 15 is taken out from the molding die 15. On the parts of the prepregs 3 pressed by the mold block 5a, the traces of the pressing on the external appearance are not recognized, because the mold block 5a does not partially press the upper surfaces of the parts where the divided cores 4a to 4h are present but presses the entirety of the upper surfaces. In addition, FIG. 6 illustrates an example in which an axle metal hub 7, which is one of metal members used in the present invention, can be integrally molded when being disposed between the four cores 4e to 4h of the disk portion 12 covered with the prepregs and being molded by the molding die by applying pressure and heat thereto. When holes for discharging the grain group 6a are bored through portions of the prepreg molded parts of the semi-finished product of the vehicle wheel thus obtained, the grain group 6a included in the core 4 is discharged to the outside through the holes, thereby completing the vehicle wheel which is the molded product having a hollow portion. In a case where the holes for discharging the grain group 6a are large, when the bag 6 which is shaped into a three-dimensional shape such as a blow-molded product, a vacuum-molded product, or an injection-molded product to accommodate the grain group 6a is made of a material having good releasability from the molded product or is doubly configured, the bag 6 in contact with the grain group 6a can be removed from the molded product. However, in a case where the bag is thick and has a complex shape and thus it is difficult to remove the bag, the bag is allowed to remain in the molded product so that the molded product and the bag are adhered to each other.

As described above, since pressure-molding can be performed on the prepreg 3 in a state where no voids occur between the core 4 and the prepreg 3, as the molded product, a product having a desired outer surface shape with a desired thickness without bends or wrinkles can be manufactured. In addition, even in a case where the internal pressure of the core 4 is low in a state where the molding die is closed, for example, the internal pressure of the core 4 can be increased by the pressing force applied by the mold block 5a, and thus a product having a desired outer surface shape with a desired thickness can be manufactured as the molded product.

Hereinafter, the present invention will be described in more detail on the basis of Examples.

EXAMPLES

Example 1

The core 4 for forming an internal hollow of the vehicle wheel illustrated in FIG. 3 was produced in the form divided in the cores of the rim portion 11 and the cores of the disk portion 12 both of which were further divided along the lines IV-IV and V-V of FIG. 3, thereby producing a total of eight divided cores 4a to 4h having the shapes illustrated in FIGS. 4 and 5. Each of the divided cores 4a to 4h was made by accommodating zirconia grains (mixed grains having diameters 1 mm and 3 mm) into the bags 6, each of which is a nylon blow-molded product, thus producing the eight divided cores 4a to 4h having the shapes illustrated in FIG. 3. Eight raw mold materials were produced by covering each of the divided cores 4a to 4h with prepreg 3 of a carbon fiber-reinforced epoxy resin (TR3110 391IMU made by Mitsubishi Rayon Co., Ltd.) laminated in five layers. These materials were assembled into substantially the same shape as the inner circumferential surface shape of the lower mold 1 to make a preform. At this time, the surface of each raw mold material was in a state of being wrapped by the prepreg 3, and thus the prepregs 3 are interposed between all the divided cores 4a to 4h of the preform adjacent to each other.

Next, after setting the preform in the concave portion 1a formed in the lower mold 1 of the molding die 15 heated to 140° C. in advance, the upper mold 2a was lowered toward the lower mold 1 to be clamped, and subsequently the mold block 5a was lowered to allow the protrusions 5a' to press the portions of the outer surfaces of the divided cores 4a to 4h at 4 MPa through the prepreg 3. After 10 minutes, the mold was opened to take out a semi-finished product. Holes for discharge were bored through the parts of the prepregs 3 disposed on the surfaces of the cores in the surface of the semi-finished product, and the grain group 6a was discharged to the outside through the holes for discharge, thereby obtaining a vehicle wheel 10 made of fiber-reinforced plastic having a plurality of complex continuous hollows therein. Since the molded product molded from the prepregs 3 was interposed between the plurality of hollows, the vehicle wheel 10 had necessary strength and rigidity. The vehicle wheel 10 had a complex shape with angular portions, undercut shapes, and vertical surfaces but also had high dimensional accuracy and excellent external appearance with no wrinkles and defects on the outer surface.

Example 2

Example 2 of the present invention will be described in detail with reference to FIG. 7. In Example 1, the example in which the cores were covered with the prepreg material and compression molding was performed by using the molding die 15 is described. However, in Example 2, resin transfer molding is performed by using the same molding die as used in Example 1, and thus a plurality of divided cores were configured to be covered with a reinforcing fiber base material made of reinforcing fiber fabric (not illustrated). Other configurations are the same as the configurations of Example 1 and the same constituent members can be sufficiently understood by using the same reference numerals as the reference numerals used in Example 1, and thus the description thereof will be omitted.

The reinforcing fiber fabric was used instead of the prepregs, the molding die 15 was closed, and a thermosetting resin was injected into the cavity from a resin injection hole (not illustrated). After filling the resin, pressurization is performed by the mold block 5a at 1 MPa and the resin was heated and cured. Next, the mold was opened to take out the vehicle wheel 10 which is a semi-finished product, and holes for discharging the cores were bored through the semi-finished product at predetermined parts so that the grain group 6a was discharged to the outside through the holes for discharge, thereby obtaining a hollow molded product. The bag that remains in the hollow portion is integrated with the reinforcing fiber fabric by the thermosetting resin during the curing of the resin.

EXPLANATIONS OF LETTERS OR NUMERALS 1 lower mold
2a upper mold
2b side mold
3 prepreg (reinforcing fiber fabric)
4 core
4a to 4h divided core
5a mold block
5a' protrusion
6 bag
6a grain group
7 axle metal hub
10 vehicle wheel
11 rim portion
12 disk portion
15 molding die
30 mold
31 lower mold
32 upper mold
33 core
33a powder grain group
33b bag
34, 35 fiber-reinforced thermoplastic resin material (FRTP)
36 prepreg
41a, 41b mold
42a, 42b molding surface
43 core
46 pressurizing unit

The invention claimed is:

1. A molding method for a fiber-reinforced plastic structure having a plurality of hollows, comprising:
   forming at least two wrapped cores each comprising a core and a reinforcing fiber base material wrapping the core, the core comprising a bag made of a flexible material and a grain group with which the bag is filled;
   disposing the at least two wrapped cores in a cavity of a mold;
   allowing the reinforcing fiber base material to be impregnated with a resin and curing the resin in the cavity; and
   removing the grain group from the bag,
   wherein, in the curing of the resin, a portion of an outer circumferential surface of at least one of the cores each wrapped with the reinforcing fiber base material is pressed with a pressing means which comes into the cavity such that the core of which a portion of an outer circumferential surface is pressed is deformed.

2. The molding method according to claim 1,
   wherein an independent metal member is further disposed in the cavity together with the at least two wrapped cores, and
   a portion comprising the reinforcing fiber base material and a portion comprising the metal member are molded integrally with each other in the cavity.

3. A vehicle wheel manufactured according to a molding method according to claim 1.

4. A manufacturing method according to claim 1, wherein the reinforcing fiber base material is reinforcing fiber fabric.

5. A manufacturing method of vehicle wheel, wherein a vehicle wheel is formed by the molding method according to claim 1.

\* \* \* \* \*